Patented Nov. 21, 1933

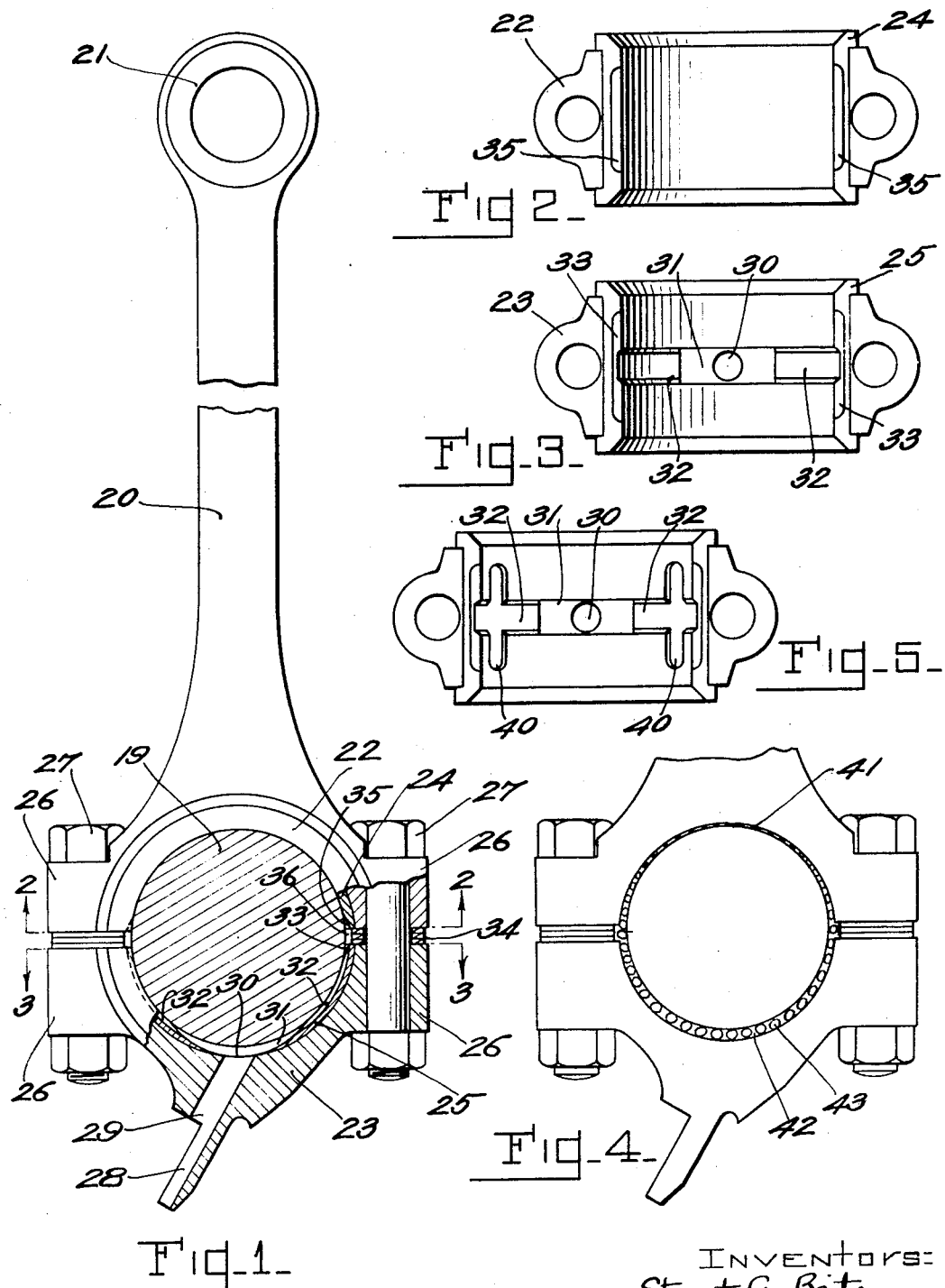

1,936,101

UNITED STATES PATENT OFFICE 1,936,101

CONNECTING ROD

Stuart G. Baits, Detroit, and Ralph H. Whisler, Halfway, Mich., assignors to Hudson Motor Car Company, Detroit, Mich., a corporation of Michigan Application October 26, 1928. Serial No. 315,256

1 Claim. (Cl. 184—13)

This invention relates to connecting rods adapted for use in internal combustion engines, especially of the type in which the lower ends of the connecting rods operate within an oil bath in the crank case and are constructed to direct lubricant to the crank pin bearings.

An object of the invention is to provide in an internal combustion engine employing the splash system type of lubrication an improved connecting rod especially of the foregoing type having improved means for lubricating the bearing surfaces between the connecting rod and crank pin.

Connecting rods of the type illustrated in the drawing operate in an oil bath in the crank case and at their lower ends are provided with scoops which dip into the oil and force it upwardly through suitable ducts to the crank pin bearings. Heretofore considerable difficulty has been experienced in respect to the lubrication of these bearings. Frequently the bearings have burned out, due to a lack of a thorough distribution of the oil over the relatively moving surfaces of the crank pin and connecting rod, particularly at the upper half of the bearing where the greater part of the load is carried on the down stroke of the piston. In accordance with the present invention as a result of which these difficulties have been overcome, during the working stroke of the connecting rod the oil will be scooped up and forced through a duct or passage into a preferably central annular groove in the lower part or cap of the connecting rod, which leads preferably to a pair of opposed transverse grooves at the junction between the upper and lower halves or parts of the crank pin sleeves. The upper half of this sleeve which embraces the upper portion of the crank pin, has a clear, smooth uninterrupted bearing surface, so that the oil when forced by a considerable pressure to this bearing surface will be squeezed outwardly and spread evenly in a film over the entire face of the upper bearing.

Other objects of this invention will appear in the following description and appended claim reference being had to the accompanying drawing forming a part of this specification.

Fig. 1 is a side elevation, partly in section, illustrating the connecting rod mounted on the crank pin and embodying the present invention.

Fig. 2 is a transverse section taken substantially on line 2—2, Fig. 1, in the direction of the arrows.

Fig. 3 is a sectional view taken substantially on line 3—3, Fig. 1, in the direction of the arrows.

Fig. 4 is a diagrammatical view.

Fig. 5 is a view similar to Fig. 3, but illustrating a somewhat modified construction.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also it is to be understood that the pharseology or terminology employed herein is for the purpose of description and not of limitation, and it is not intended to limit the invention beyond the terms of the claim hereto appended as considered in view of the prior art and the requirements thereof.

Referring to the drawing the connecting rod 20 at its upper end is provided with the usual wrist pin bearing 21 and at its lower end is provided with a sleeve adapted to embrace the crank pin 19, this sleeve being constructed in two parts or halves, namely, an upper bearing part 22 and a lower bearing part or cap 23. The inner spherical faces of the parts 22 and 23 are provided with the usual Babbitt lining 24 and 25, respectively, forming the bearing faces embracing the crank pin 19. The sleeve portions 22 and 23 are provided with bosses 26 having vertically alined holes for the reception of bolts 27 by means of which the parts are secured together.

The cap or sleeve portion 23 of the connecting rod is provided at its lower end with a scoop 28 and an upwardly extending oil passage or duct 29 extending through the Babbitt lining 25 by means of a port 30. Adjacent the port 30 the Babbitt lining 25 is cut or milled out to provide a central deep groove or channel pocket 31. This pocket 31 at opposite ends tapers into shallower grooves 32 terminating preferably in transverse bevelled or chamfered portions 33.

Interposed between the bosses 26 of the upper and lower sleeve portions 22 and 23 of the connecting rod are shims 34; each shim terminates at its inner edge at or slightly short of the Babbitt linings 24 and 25, as shown in Fig. 1. The inner spherical face of the upper bearing 24 is smooth providing an uninterrupted bearing surface, the lower transverse edge of the Babbitt lining 24, however, at each side thereof, being preferably chamfered or bevelled at 35. From this construction it will be seen that a transverse oil groove or pocket 36 is formed between the chamfered edges 33 and 35 and the inner edge of the shim 34, see Fig. 1. This groove provides a passage at each side of the bearing by means of which fine particles of dirt or foreign matter in the oil may work out, particularly particles which are too small to be affected by ordinary oil filters but which otherwise would work into the bearing faces and cut the Babbitt lining.

From the foregoing it will be seen that during the operation of the connecting rod the oil will be caught by the scoop 28 and forced upwardly through the oil passage 29 and port 30 into the relatively deep oil groove or pocket 31. The oil will be carried in opposite directions through the shallower grooves 32 into the transverse grooves or pockets 36. Relative rotation of the connecting rod and crank pin 19 will result in distributing and spreading the oil over the entire surface of the upper and lower bearings 24 and 25.

Referring to Fig. 5, the construction is similar to that described above with the exception that a transverse oil groove 40 is milled in the babbitt lining at each side of the port 30 intermediate the pocket or groove 31 and the pocket 36. Each groove 40 extends in opposite directions from the groove 32, so that a part of the oil forced through the groove 32 will spread laterally in the pocket 40 and effectually lubricate the lower bearing 25, as well as providing an oil supply for the upper part of the bearing.

Heretofore, in splash systems of lubrication it has been the practice to provide oil grooves in the upper half of the connecting rod bearing, this having been considered necessary in order to conduct and distribute the oil thereto. Between the connecting rod and the crank pin when assembled there is a slight clearance which is taken up normally by the oil which lubricates the relatively moving surfaces. The greater part of the load on the connecting rod bearing is taken by the upper half thereof on the down stroke of the piston. At this time this clearance is greatly reduced between the crank pin and upper half of the bearing, indicated diagrammatically at 41 in Fig. 4, as compared with the clearance 42 at the lower part of the bearing. Since the oil is resolved into minute spherical globules, like multiple balls, as indicated at 43 in Fig. 4, forming a bearing between the metal surfaces, this oil when squeezed under great pressure between the crank pin and upper bearing part will flow to any point where this pressure is reduced. We have found that where grooves are provided in the upper bearing half, the oil instead of spreading over the metal surfaces is forced or squeezed into and through the grooves, where the greatest clearance is provided resulting in metal to metal contact at the areas adjacent the grooves. According to the present invention therefore, the grooves in the lower half of the bearing, and at the junction between the upper and lower halves, provide pockets furnishing an oil supply for the upper half where most of the load is carried. On the down stroke of the piston, the oil will be squeezed and forced over the entire surface, providing a uniform bearing film and preventing metal to metal contact.

What we claim is:

A connecting rod having at its end a two part crank pin bearing, a scoop carried by the lower part and provided with an oil passage leading into a port in the lower bearing part, a journal eccentrically rotatable within the bearing, the upper bearing part being subject to greater pressure in operation than the lower bearing part and in the zone of maximum load having an uninterrupted bearing surface, the lower bearing part having a circumferentially extending channel leading from said port and terminating at the junction between said bearing parts in depressions thereby effecting the separation of foreign matter from the oil.

STUART G. BAITS.
RALPH H. WHISLER.